Figure 1:
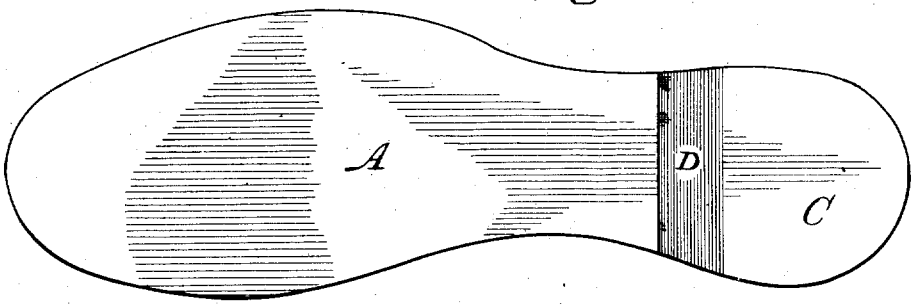

A. H. PRENZEL.

PROCESS FOR MAKING SHOES.

APPLICATION FILED JUNE 8, 1911.

Reissued July 23, 1912. 13,447.

WITNESSES

Elizabeth C. Coufe

O. Blanche Hargraves.

INVENTOR.

Adam Henry Prenzel

By his Attorney

Nelson W. Holland

UNITED STATES PATENT OFFICE.

ADAM HENRY PRENZEL, OF HALIFAX, PENNSYLVANIA, ASSIGNOR TO UNITED SHOE MACHINERY COMPANY, OF PATERSON, NEW JERSEY, A CORPORATION OF NEW JERSEY.

PROCESS FOR MAKING SHOES.

13,447. Specification of Reissued Letters Patent. Reissued July 23, 1912.

Original application filed June 25, 1909, Serial No. 504,276. Divided and application filed September 1, 1909, Serial No. 515,574. Original No. 960,234, dated May 31, 1910. Application for reissue filed June 8, 1911. Serial No. 632,099.

*To all whom it may concern:*

Be it known that I, ADAM HENRY PRENZEL, a citizen of the United States, residing at Halifax, in the county of Dauphin and State of Pennsylvania, have invented new and useful Improvements in Processes for Making Shoes, of which the following is a specification.

This invention relates to improvements in shoes and is more particularly applicable to those shoes designed for the use of children in which a wedge is inserted under the heel seat to raise the heel while at the same time preserving the continuity of the bottom from the front to the extreme rear.

The article made by this process is disclosed and claimed in a prior application No. 504,276, filed June 25, 1909, of which this is a divisional application.

The usual manner of constructing a shoe of the type mentioned is to take a continuous piece of leather forming the sole and heel portions and sew the upper to the sole portion. A heel seat is then placed inside the shoe and a wedge is placed above the heel proper. That portion of the upper above the heel is fastened to the heel seat by tacking. The heel thus constructed is nailed in the usual manner. This method has one great disadvantage, namely, that it requires hand labor to insert and tack down the heel seat. Furthermore, the front edge of the heel seat forms a raised ridge which requires the insertion of a leveling strip on the inside of the shoe in order to give a smooth surface for the finished shoe.

An object of my invention is to provide a shoe in which the heel seat is secured by sewing it to the upper by a machine, thus doing away with the manual labor required when the heel seat is tacked in.

A further object of my invention is to provide a shoe with a smooth surface on the inner as well as the outer sides of the sole and heel portions, thus eliminating the necessity of a leveling strip on the inside of the shoe.

A further object is to construct a shoe in such a manner that the upper can be secured to the heel portion at any desired distance from the edge by merely beveling the edge of the heel seat at the proper angle.

Other objects and advantages will appear from the following specification and the novel features will be particularly pointed out in the appended claims.

My invention is illustrated in the accompanying drawings in which—

Figure 2:
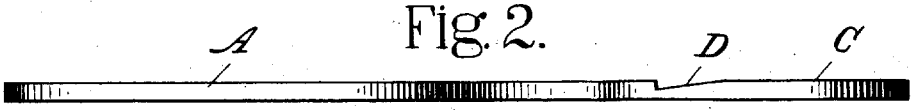
Figure 4:
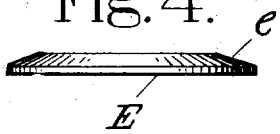
Figure 3:
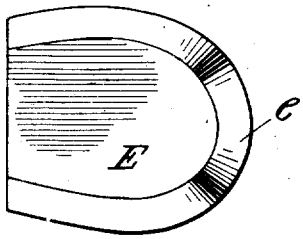
Figure 5:
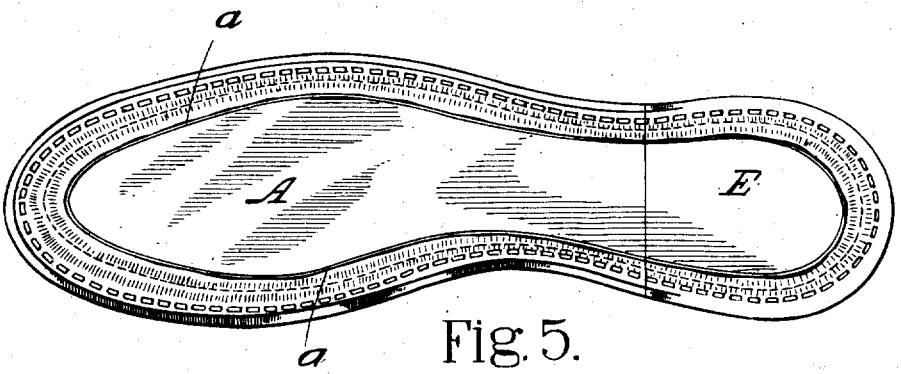
Figure 6:
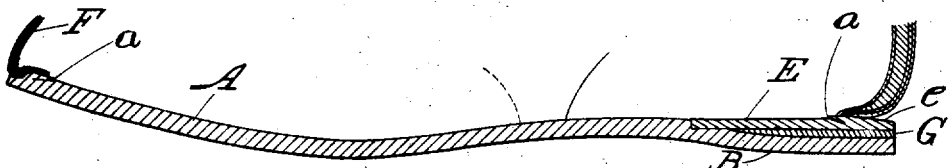

Figure 1 is a plan view of the bottom piece showing the sole and recessed heel portion; Fig. 2 is an edge view of the parts shown in Fig. 1; Fig. 3 is a plan view of the beveled heel seat; Fig. 4 is an edge view of the heel seat; Fig. 5 is a plan view of the channeled sole and heel seat; and Fig. 6 is a central vertical section of the bottom portion of a finished shoe.

In carrying out my invention, I provide a bottom piece of the shape shown in Fig. 1 having the sole portion A and the heel portion B. I recess the heel portion slightly at C and toward the inner end of the heel portion I make the recess deeper as shown at D. The recessing of the heel portion is done on a machine. The heel seat E is beveled around its outer edge in the manner shown at *e* in Figs. 3 and 4. It is then placed in the recessed portion C D prepared for it and is glued temporarily in place. The piece thus formed is channeled as at *a* by a channeling machine, the heel seat E being treated in the same manner as the sole portion A, as shown in Fig. 5, except that the shoulder formed upon the outer edge of the sole portion is not extended around the heel seat, the bevel *e* serving the purposes of the shoulder in sewing the upper to the heel seat. The upper F, which is turned inside out, is now sewed both to the sole and to the heel seat, this being effected by one operation. The upper is now turned back, the heel seat separated from the heel portion B to which it was temporarily glued, and the wedge G inserted between the heel seat and the heel. The heel thus formed is nailed in the usual manner.

It will be seen that with this process, the hand labor involved in tacking in the heel seat is avoided. Both the inside and outside of the bottom form smooth, continuous surfaces, as clearly shown in Fig. 5.

The upper may be secured close to the edge of the heel seat or farther away from the edge by varying the angle and extent of the beveled edge *e* and sewing the upper accordingly, the beveled edge serving to set the upper away from the heel seat.

The recess C D in the heel as well as the heel seat E may be varied as to size or shape to suit occasion without departing in the least from the spirit of the invention.

Having described my invention, what I claim as new and desire to secure by Letters Patent of the United States is:—

1. The herein described process of making spring heel shoes, which consists in cutting away a part of the upper side of the heel portion of a bottom piece, the depth of the cut at the front end of the heel portion being equal to the thickness of the heel seat, temporarily gluing a heel seat of uniform thickness in said cut-away portion, forming a continuous channel in the sole and heel seat, sewing along said channel to unite the upper wrong side out to the sole and heel seat, turning the shoe, separating the temporarily glued heel seat from the bottom piece, inserting a wedge between said separated parts, and permanently securing the wedge between the bottom and the heel seat.

2. The herein described process of making shoes which consists in recessing the upper side of the heel portion of a bottom piece, securing temporarily in said recessed portion a heel seat having its front end shaped to fit the front end of the recess in such manner that the front end of the recess and the corresponding end of the heel seat abut, forming a continuous channel in the sole and heel seat, sewing the upper wrong side out to the sole and to the heel seat, turning the shoe, separating said heel seat from said bottom piece and permanently securing a wedge between said separated parts.

3. The herein described process of making shoes which consists in recessing the upper side of the heel portion of a bottom piece, temporarily gluing in said recess a heel seat having its front end shaped to fit the front end of the recess in such manner that the front end of the recess and the corresponding end of the heel seat may abut, forming a continuous channel in said sole and heel seat, sewing the upper wrong side out to the sole and to the heel seat, turning the shoe, separating the temporarily glued heel seat from the bottom piece, and permanently securing a wedge between said separated parts.

4. In a process for making turn shoes, recessing the upper side of the heel portion of a bottom piece, temporarily securing in said recessed portion a heel seat having its front end shaped to fit the front end of the recess in such manner that the front end of the heel seat and the corresponding end of the recess abut, permanently securing an upper to the sole and heel seat, separating said heel seat from said bottom piece and permanently securing a wedge between said separated parts.

5. That improvement in the art of making spring heel shoes which consists in forming in the heel portion of a sole a recess having a front wall, temporarily securing a heel seat to said sole with the front end of said heel seat abutting against the front wall of said recess and with the upper surface of said heel seat substantially flush with the upper surface of the sole at the junction of said surfaces, forming a continuous sewing channel in the sole and in the heel seat, sewing the upper wrong side out to the sole and to the heel seat, turning the shoe, separating the sole and the heel seat, and permanently securing a wedge between said separated parts.

6. That improvement in the art of making spring heel shoes which consists in so recessing the heel end of a sole that a wall is provided against which the front end of a heel seat may abut, temporarily securing in the said abutting relation a heel seat of a thickness to carry a sewing channel extending from the front end on one side around to the front end on the other side, forming in the sole and in the heel seat a continuous sewing channel, sewing the upper wrong side out to the sole and to the heel seat, turning the shoe, separating the sole and the heel seat, and permanently securing a wedge between said separated parts.

7. That improvement in the art of making turn shoes which consists in forming in the heel portion of a sole a recess having a front wall, beveling a heel seat along its outer edge and temporarily securing said heel seat to said sole with the front end of said heel seat abutting against the front wall of said recess and with the upper surface of said heel seat substantially flush with the upper surface of the sole at the junction of said surfaces, forming a continuous sewing channel in the sole and in the heel seat, sewing the upper wrong side out to the sole and to the heel seat, turning the shoe, separating the sole and the heel seat, and permanently securing a wedge between said separated parts.

In testimony whereof I have signed my name to the specification in the presence of two subscribing witnesses.

ADAM HENRY PRENZEL.

Witnesses:
LUTHER W. RYAN,
GEORGE W. SHULTZ.